(12) United States Patent
Sethi et al.

(10) Patent No.: US 12,254,208 B2
(45) Date of Patent: Mar. 18, 2025

(54) PROACTIVE REBALANCING OF DATA AMONG STORAGE DEVICES THAT ARE PART OF A VIRTUAL DISK

(71) Applicant: Dell Products L.P., Round Rock, TX (US)

(72) Inventors: Parminder Singh Sethi, Ludhiana (IN); Suren Kumar, Bangalore (IN); Akshita Das, Gandhinagar (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/105,985

(22) Filed: Feb. 6, 2023

(65) Prior Publication Data

US 2024/0264763 A1   Aug. 8, 2024

(51) Int. Cl.
  *G06F 3/06*   (2006.01)
  *G06F 11/30*  (2006.01)

(52) U.S. Cl.
  CPC ............ *G06F 3/065* (2013.01); *G06F 3/0619* (2013.01); *G06F 3/0689* (2013.01); *G06F 11/3034* (2013.01)

(58) Field of Classification Search
  None
  See application file for complete search history.

(56) References Cited

U.S. PATENT DOCUMENTS

| | | | | |
|---|---|---|---|---|
| 9,244,790 B1 * | 1/2016 | Ma | ............... | G06F 11/008 |
| 10,635,324 B1 * | 4/2020 | Klein | ............ | G06F 3/0653 |
| 2007/0067665 A1 * | 3/2007 | Hashemi | ............ | G06F 3/0605 |
| | | | | 714/E11.034 |
| 2009/0177918 A1 * | 7/2009 | Abali | ............ | G06F 11/1092 |
| | | | | 714/E11.122 |
| 2014/0359347 A1 * | 12/2014 | Fuxa | ............ | G06F 11/1096 |
| | | | | 714/6.22 |
| 2020/0310932 A1 * | 10/2020 | Hutchison | ............ | G06F 3/0644 |
| 2021/0326275 A1 * | 10/2021 | Anirudhan | ............ | G06F 11/3034 |
| 2023/0393772 A1 * | 12/2023 | Benisty | ............ | G06F 3/0647 |

OTHER PUBLICATIONS

Li et al. (ProCode: A Proactive Erasure Coding Scheme for Cloud Storage Systems; pp. 219-228); 2016 IEEE (Year: 2016).*

(Continued)

*Primary Examiner* — Kaushikkumar M Patel
(74) *Attorney, Agent, or Firm* — Ryan, Mason & Lewis, LLP

(57) ABSTRACT

An apparatus comprises a processing device configured to monitor a health status of storage devices that are part of a virtual disk and to identify a first subset of the storage devices that have a first health status and a second subset of the storage devices that have a second health status. The processing device is also configured, responsive to determining that there is sufficient available storage capacity on the second subset of the storage devices to copy data from used storage capacity on the first subset of the storage devices, to resize the virtual disk to a storage capacity determined as a function of storage capacities of the second subset of the storage devices allocated to the virtual disk and to copy data from the used storage capacity on the first subset of the storage devices to the available storage capacity on the second subset of the storage devices.

20 Claims, 14 Drawing Sheets

(56) References Cited

OTHER PUBLICATIONS

Pinciroli et al. (Lifespan and Failures of SSDs and HDDs: Similarities, Differences, and Prediction Models; pp. 256-272); original date of pub. Nov. 2021, current version 16, Jan. 2023. (Year: 2023).*
Jing Li et al. (New Metrics for Disk Failure Prediction That Go Beyond Prediction Accuracy; pp. 76627-76639). IEEE 2018 (Year: 2018).*
Dell EMC, "SupportAssist for Enterprise Systems," Rev. 1.1, Jan. 2016, 2 pages.
Dell EMC, "Understanding RAID with Dell SC Series Storage," A Dell Technical White Paper, Sep. 2016, 35 pages.
Dell Inc., "Dell SupportAssist Agent User's Guide," Rev. A00, Feb. 2015, 15 pages.
Dell EMC, "Dell PowerEdge: How to Create a Virtual Disk Using iDRAC9," Article No. 000129249, Nov. 18, 2022, 4 pages.

\* cited by examiner

ERROR
SCREENSHOT
500

DATE: 2022-04-21

TIME: 09:18:37

MESSAGE ID: PDR114

MESSAGE: THE DISK 0 ON INTEGRATED BOSS 5 IS APPROACHING READ-ONLY MODE. PART NUMBER = AB-12345-67890

LOG SEQUENCE NUMBER: 123456

DETAILED DESCRIPTION: THE PCIe SOLID STATE DEVICE IDENTIFIED IN THE MESSAGE IS BETWEEN 90% AND 100% OF REACHING READ-ONLY MODE.

RECOMMENDED ACTION: NO RESPONSE ACTION IS REQUIRED

FIG. 5

| POLICY | PREDICTED FAILURE PERCENTAGE | CONTROLLER BANDWIDTH FOR INPUT-OUTPUT (IO) MANAGEMENT | CONTROLLER BANDWIDTH FOR REPAIR OPERATIONS |
|---|---|---|---|
| POLICY 1 | PREDICTED FAILURE PERCENTAGE < 30% | 100% CONTROLLER BANDWIDTH USED FOR IO MANAGEMENT | WHEN CONTROLLER IS LESS LOADED, FREE BANDWIDTH WILL BE ALLOCATED FOR DATA COPY OPERATIONS FROM DISK(S) PREDICTED TO FAIL FOR VD REPAIR. |
| POLICY 2 | 30% ≤ PREDICTED FAILURE PERCENTAGE < 50% | 70% CONTROLLER BANDWIDTH USED FOR IO MANAGEMENT | 30% CONTROLLER BANDWIDTH ALLOCATED FOR DATA COPY OPERATIONS FROM DISK(S) PREDICTED TO FAIL FOR VD REPAIR. WHEN CONTROLLER HAS NO LOAD, 100% BANDWIDTH WILL BE ALLOCATED FOR DATA COPY OPERATIONS FROM DISK(S) PREDICTED TO FAIL FOR VD REPAIR. |
| POLICY 3 | 50% ≤ PREDICTED FAILURE PERCENTAGE < 70% | 50% CONTROLLER BANDWIDTH USED FOR IO MANAGEMENT | 50% CONTROLLER BANDWIDTH ALLOCATED FOR DATA COPY OPERATIONS FROM DISK(S) PREDICTED TO FAIL FOR VD REPAIR. WHEN CONTROLLER HAS NO LOAD, 100% BANDWIDTH WILL BE ALLOCATED FOR DATA COPY OPERATIONS FROM DISK(S) PREDICTED TO FAIL FOR VD REPAIR. |

FIG. 9

PROACTIVE REBALANCING OF DATA AMONG STORAGE DEVICES THAT ARE PART OF A VIRTUAL DISK

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input/output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for proactive rebalancing of data among storage devices that are part of a virtual disk.

In one embodiment, an apparatus comprises at least one processing device comprising a processor coupled to a memory. The at least one processing device is configured to monitor a health status of two or more storage devices that are part of a virtual disk, the virtual disk utilizing a redundant array of independent disks striping configuration. The at least one processing device is also configured to identify, based at least in part on the monitored health status, a first subset of the two or more storage devices that have a first health status and a second subset of the two or more storage devices that have a second health status. The at least one processing device is further configured to determine whether available storage capacity on the second subset of the two or more storage devices is sufficient to copy data from used storage capacity on the first subset of the two or more storage devices and, responsive to determining that there is sufficient available storage capacity on the second subset of the two or more storage devices, to resize the virtual disk from (i) a first storage capacity determined at least in part as a function of portions of storage capacities of the first and second subsets of the two or more storage devices which are allocated to the virtual disk to (ii) a second storage capacity determined at least in part as a function of portions of storage capacities of the second subset of the two or more storage devices which are allocated to the virtual disk. The at least one processing device is further configured to copy data from the used storage capacity on the first subset of the two or more storage devices to the available storage capacity on the second subset of the two or more storage devices.

These and other illustrative embodiments include, without limitation, methods, apparatus, networks, systems and processor-readable storage media.

BRIEF DESCRIPTION OF THE DRAWINGS

FIG. 5 shows an example of an error message indicating predicted failure of a physical disk that is used to provide a portion of a RAID virtual disk in an illustrative embodiment.

FIG. 9 shows a table of policies for allocating storage controller bandwidth based on a predicted failure percentage of a physical disk that provides at least a portion of a RAID virtual disk in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
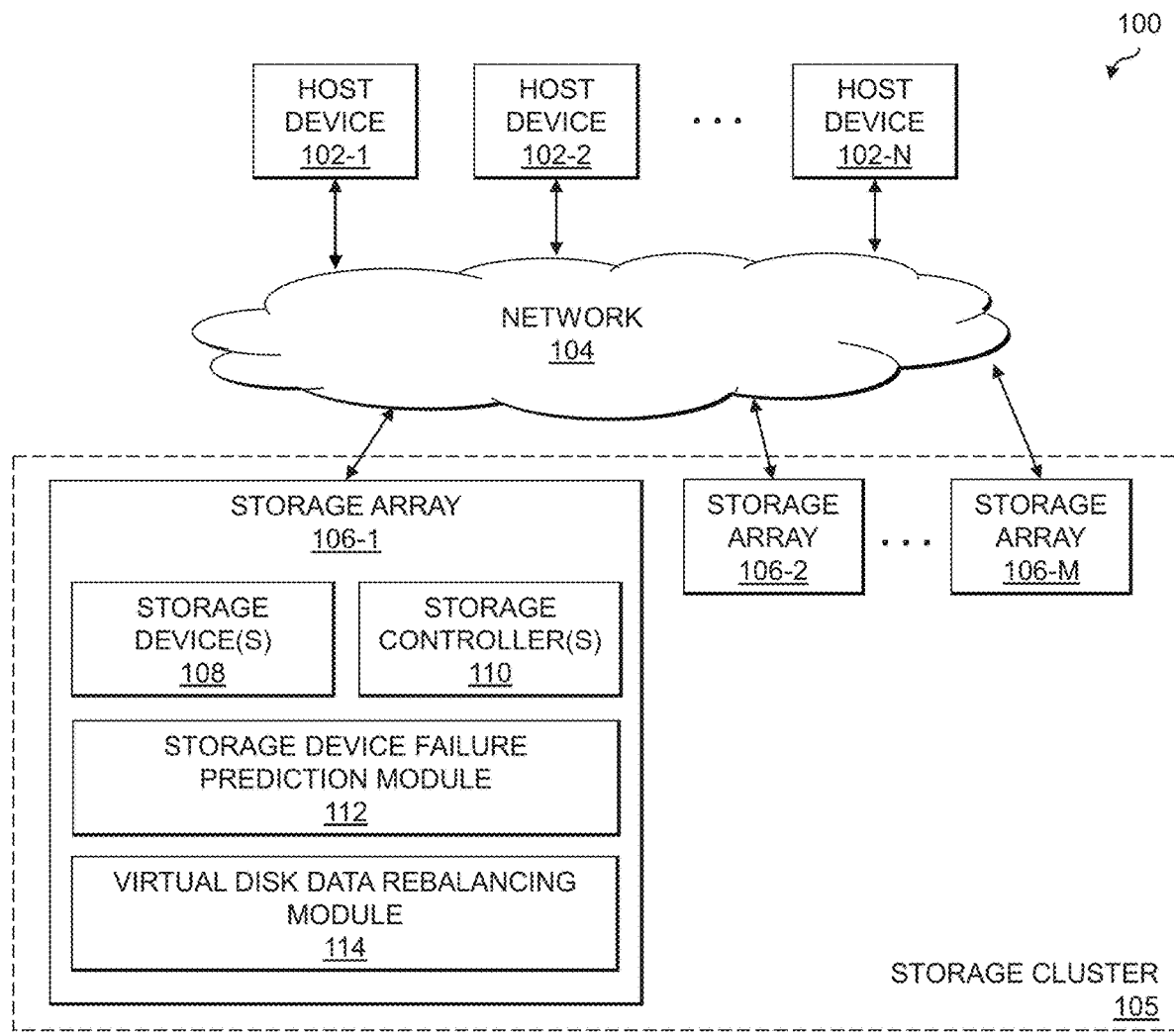
FIG. 1 is a block diagram of an information processing system configured for proactive rebalancing of data among storage devices that are part of a virtual disk in an illustrative embodiment.

FIG. 1 shows an information processing system 100 configured in accordance with an illustrative embodiment to provide functionality for proactive rebalancing of data among storage devices that are part of a virtual disk, such as a virtual disk implementing a redundant array of independent disks (RAID) striping configuration where one or more of the storage devices is predicted to fail or otherwise unhealthy. The information processing system 100 comprises one or more host devices 102-1, 102-2, ... 102-N (collectively, host devices 102) that communicate over a network 104 with one or more storage arrays 106-1, 106-2, ... 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (IO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input/output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 are assumed to be part of a storage cluster 105 (e.g., where the storage arrays 106 may be used to implement one or more storage nodes in a cluster storage system comprising a plurality of storage nodes interconnected by one or more networks), and the host devices 102 are assumed to submit IO operations (e.g., as part of storage workloads of one or more applications running on the host devices 102) to be processed by the storage cluster 105.

In some embodiments, the storage cluster 105 or at least one of the storage arrays 106 that are part of the storage cluster 105 are assumed to provide one or more RAID virtual disks, such as one or more RAID virtual disks with a RAID0 (e.g., striping) configuration using multiple physical disks (e.g., multiple ones of the storage devices 108). At least one of the storage controllers of the storage arrays 106 (e.g., the storage controller 110 of storage array 106-1) is assumed to implement functionality for performing proactive data rebalancing to preserve data in a given one of the RAID virtual disks having one or more physical disks that are predicted to fail. Such functionality is provided via a storage device failure prediction module 112 and a virtual disk data rebalancing module 114. The storage device failure prediction module 112 is configured to monitor a health status of two or more storage devices that are part of a virtual disk, the virtual disk utilizing a RAID striping configuration (e.g., a RAID0 configuration). The storage device failure prediction module 112 is further configured to identify, based at least in part on the monitored health status, a first subset of the two or more storage devices that have a first health status (e.g., which are failing, are predicted to fail or otherwise unhealthy) and a second subset of the two or more storage devices that have a second health status (e.g., which are healthy). The virtual disk data rebalancing module 114 is configured to determine whether available storage capacity on the second subset of the two or more storage devices is sufficient to copy data from used storage capacity on the first subset of the two or more storage devices and, responsive to determining that there is sufficient available storage capacity on the second subset of the two or more storage devices, to resize the virtual disk from (i) a first storage capacity comprising a sum of portions of the storage capacities of the first and second subsets of the two or more storage devices which are allocated to the virtual disk to (ii) a second storage capacity comprising a sum of storage capacities of the second subset of the two or more storage devices which are allocated to the virtual disk. The virtual disk data rebalancing module 114 is further configured to copy data from the used storage capacity on the first subset of the two or more storage devices to the available storage capacity on the second subset of the two or more storage devices.

Although in the FIG. 1 embodiment the storage device failure prediction module 112 and the virtual disk data rebalancing module 114 are shown as being implemented internal to the storage array 106-1 and outside the storage controllers 110, in other embodiments one or both of the storage device failure prediction module 112 and the virtual disk data rebalancing module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of one or both of the storage device failure prediction module 112 and the virtual disk data rebalancing module 114.

At least portions of the functionality of the storage device failure prediction module 112 and the virtual disk data rebalancing module 114 may be implemented at least in part in the form of software that is stored in memory and executed by a processor.

As noted above, the storage arrays 106 in some embodiments are assumed to be part of the storage cluster 105. The storage cluster 105 is assumed to provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 13 and 14.

It is to be understood that the particular set of elements shown in FIG. 1 for proactive rebalancing of data among storage devices that are part of a virtual disk is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for proactive rebalancing of data among storage devices that are part of a virtual disk will now be described in more detail with reference to the flow diagram of FIG. 2. It is to be understood that this particular process is only an example, and that additional or alternative processes for proactive rebalancing of data among storage devices that are part of a virtual disk may be used in other embodiments.

In this embodiment, the process includes steps 200 through 208. These steps are assumed to be performed by the storage device failure prediction module 112 and the virtual disk data rebalancing module 114. The process begins with step 200, monitoring a health status of two or more storage devices (e.g., physical disks) that are part of a virtual disk, the virtual disk utilizing a RAID striping configuration (e.g., a RAID0 configuration). Step 200 may include obtaining one or more error logs utilizing one or more support tools associated with the storage system. The one or more error logs comprise Self-Monitoring, Analysis and Reporting Technology (SMART) error logs generated by respective ones of the two or more storage devices.

In step 202, a first subset of the two or more storage devices that have a first health status and a second subset of the two or more storage devices that have a second health status are identified based at least in part on the monitored health status. The first health status may comprise a failing health status and the second health status may comprise a non-failing health status.

A determination is made in step 204 as to whether available storage capacity on the second subset of the two or more storage devices is sufficient to copy data from used storage capacity on the first subset of the two or more storage devices. Responsive to determining that there is sufficient available storage capacity on the second subset of the two or more storage devices, the FIG. 2 process may include placing the first subset of the two or more storage devices in a frozen state where incoming data reads are permitted but incoming data writes are blocked. Responsive to determining that there is not sufficient available storage capacity on the second subset of the two or more storage devices, the FIG. 2 process may include generating and providing one or more notifications to one or more users associated with the virtual disk (e.g., indicating that there are failing storage devices and that the virtual disk is at risk of data loss).

In step 206, responsive to determining that there is sufficient available storage capacity on the second subset of the two or more storage devices in step 204, the virtual disk is resized from (i) a first storage capacity determined at least in part as a function of portions of storage capacities of the first and second subsets of the two or more storage devices which are allocated to the virtual disk to (ii) a second storage capacity determined at least in part as a function of portions of storage capacities of the second subset of the two or more storage devices which are allocated to the virtual disk. In some embodiments, the first storage capacity comprises a sum of the portions of the storage capacities of the first and second subsets of the two or more storage devices which are allocated to the virtual disk, while the second storage capacity comprises a sum of the portions of the storage capacities of the second subset of the two or more storage devices which are allocated to the virtual disk. Data from the used storage capacity on the first subset of the two or more storage devices is copied to the available storage capacity on the second subset of the two or more storage devices in step 208.

Figure 2:
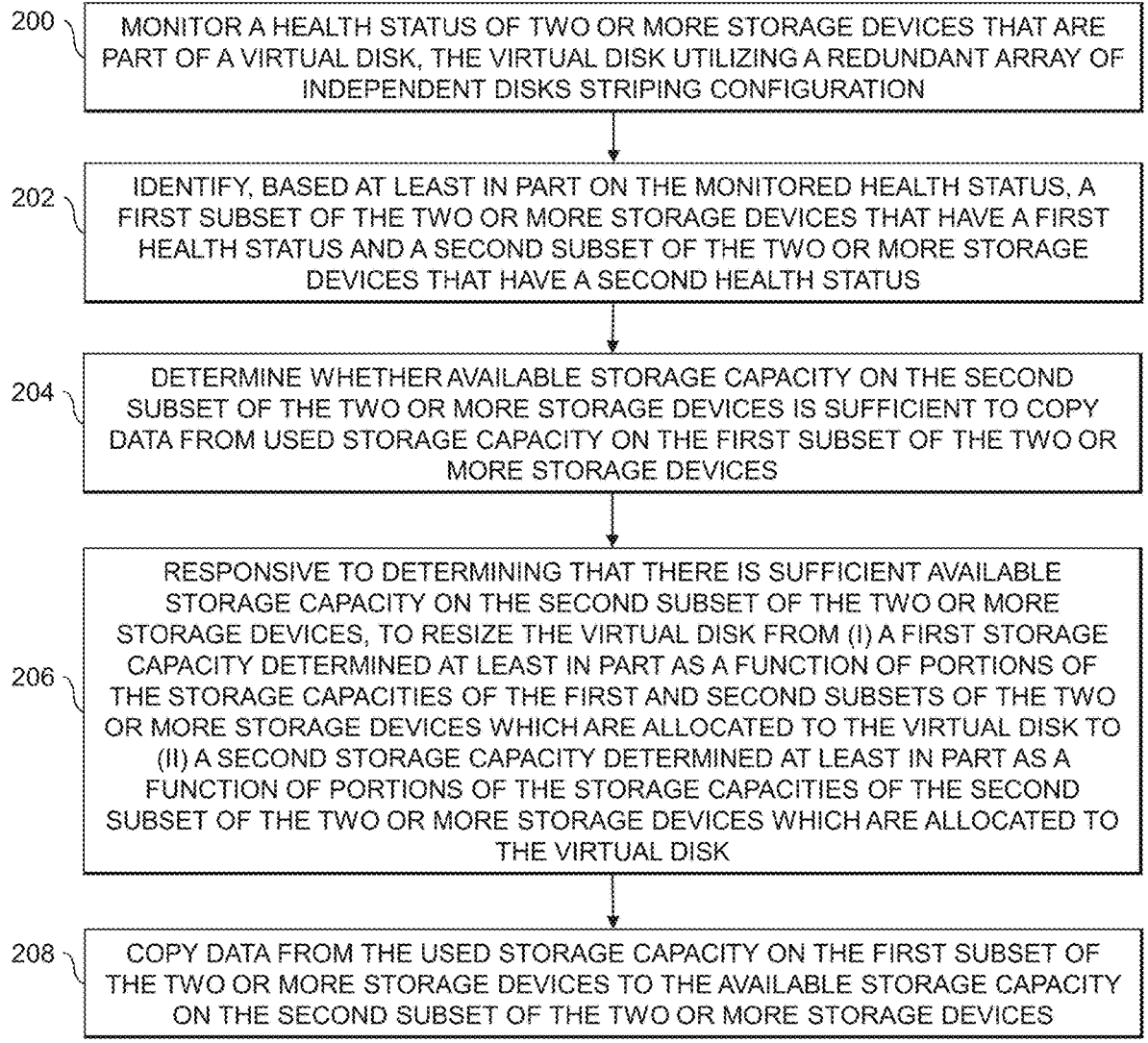
FIG. 2 is a flow diagram of an exemplary process for proactive rebalancing of data among storage devices that are part of a virtual disk in an illustrative embodiment.

The FIG. 2 process may further include determining, for each of the storage devices in the first subset of the two or more storage devices, an estimated time to failure. The estimated time to failure for a given one of the storage devices in the first subset of the two or more storage devices may be determined based at least in part on comparing error percentages in two or more timestamped error logs associated with the given storage device. The FIG. 2 process may also include adjusting an amount of storage controller bandwidth allocated for copying the data from the used storage capacity on the first subset of the two or more storage devices to the available storage capacity on the second subset of the two or more storage devices based at least in part on the estimated time to failure of each of the storage devices in the first subset of the two or more storage devices.

In some embodiments, the FIG. 2 process includes, during copying of the data from the used storage capacity on the first subset of the two to the available storage capacity on the second subset of the two or more storage devices, determining and dynamically updating estimated time to failure values for each of the storage devices in the first subset of the two or more storage devices and dynamically adjusting an amount of storage controller bandwidth allocated for copying the data from the used storage capacity on the first subset of the two or more storage devices to the available storage capacity on the second subset of the two or more storage devices based at least in part on the dynamically updated estimated time to failure values for each of the storage devices in the first subset of the two or more storage devices.

The FIG. 2 process may include controlling, based at least in part on the monitored health status of the two or more storage devices, a first amount of storage controller bandwidth allocated for processing incoming input-output operations directed to the virtual disk and a second amount of storage controller bandwidth allocated for copying of the data from the used storage capacity on the first subset of the two to the available storage capacity on the second subset of the two or more storage devices. Controlling the first and second amounts of storage controller bandwidth may comprise increasing the second amount of storage controller bandwidth and decreasing the first amount of storage controller bandwidth as a predicted time to failure of one or more of the storage devices in the first subset of the two or more storage devices decreases. Controlling the first and second amounts of storage controller bandwidth may comprise selecting from among two or more policies based at least in part on a predicted time to failure of one or more of the storage devices in the first subset of the two or more storage devices.

Various types of RAID configurations are used by different end users. A RAID0 (e.g., striping) configuration is often used when the speed of data processing is paramount, including in use cases such as video streaming, gaming, etc. These and other types of workloads require high storage performance which benefits from a virtual disk that implements the RAID0 configuration. The downside, however, is that a virtual disk with a RAID0 configuration has no mechanism within the storage controller for withstanding, recovering or rebalancing drive failure of one or physical disks or storage devices that are part of the virtual disk. When a physical disk that is part of a virtual disk with a RAID0 configuration fails, a new physical disk may be added to replace the failed disk, but this does not provide in-built fault tolerance at runtime. Third-party backup tools can be used to back up the data stored in a virtual disk with a RAID0 configuration, but such tools do not provide functionality for preserving, restoring and dynamically rebalancing the RAID0 entities.

Other options include migrating a virtual disk (VD) to a different RAID configuration (e.g., RAID1/mirroring, RAID5/distributed parity, RAID6/dual parity, etc.). Such other RAID configurations, however, do not provide the same level of performance as RAID0 and thus may not be suitable for certain workloads requiring high storage performance. Migrating to a different RAID level (e.g., from RAID0 to RAID1/5/6) is therefore not a viable solution, as it can result in loss of storage space and performance impacts. Consider, for example, a RAID0 VD that is created using 100 gigabytes (GB) of storage from four different physical disks, such that the RAID0 VD has an overall capacity of 400 GB. Migrating this RAID0 VD to a RAID1 configuration will lead to a reduction in capacity of the VD to 200 GB, along with requiring new physical disk addition during physical disk failure scenarios. As noted above, a RAID0 configuration may be chosen for workload or application needs, and thus migrating to a different RAID level may lead to unacceptable performance impacts which are not an appropriate option in certain use cases.

Illustrative embodiments provide technical solutions for dynamically rebalancing VD entities (e.g., RAID0 VDs) within a storage controller in response to predicting failure of one or more physical disks (also referred to herein as physical drives or storage devices) which provide at least a portion of the capacity of the VD. Advantageously, the dynamic rebalancing can use currently available physical disks and does not require the addition of a new physical disks. Data integrity is maintained by resyncing data from a failing physical disk, where the amount of resources allocated to the resyncing operation is based at least in part on a forecast of the possible time that one or more physical disks, which provide at least a portion of the capacity of a VD, are predicted to fail. From an application or host perspective, reads and writes will continue without any downtime. A storage controller will transition the VD from a normal operating state to a repair state in response to detecting one or more unhealthy physical disks (e.g., physical disks which are predicted to fail within some designated threshold period of time). The unhealthy physical disks will be marked as a "frozen" state, where further write operations to physical disks in the frozen state are blocked. Reads, however, are allowed from physical disks in the frozen state, both for application continuity and for data resyncing operations as described in further detail below.

In some embodiments, the prediction of failure of a physical disk is based at least in part on analyzing Self-Monitoring, Analysis and Reporting Technology (SMART) logs obtained using one or more support tools. In some embodiments, an enterprise framework allows customers or end-users to define rules or policies (or customize a set of default rules or policies) for resyncing operations (e.g., an amount of bandwidth which is allocated or reserved for data resyncing operations versus normal IO operations). This may be done by defining various policies for data resyncing, where particular policies are selected based at least in part on the estimated time of failure of the unhealthy physical disks. In some embodiments, this includes monitoring the change in percentage of SMART errors. The policy-driven approach allows for redirecting the write operations from unhealthy physical disks, and for repairing and rebalancing the overall VD (e.g., with a RAID0 configuration) by changing the stripe size in the RAID environment.

Figure 3:
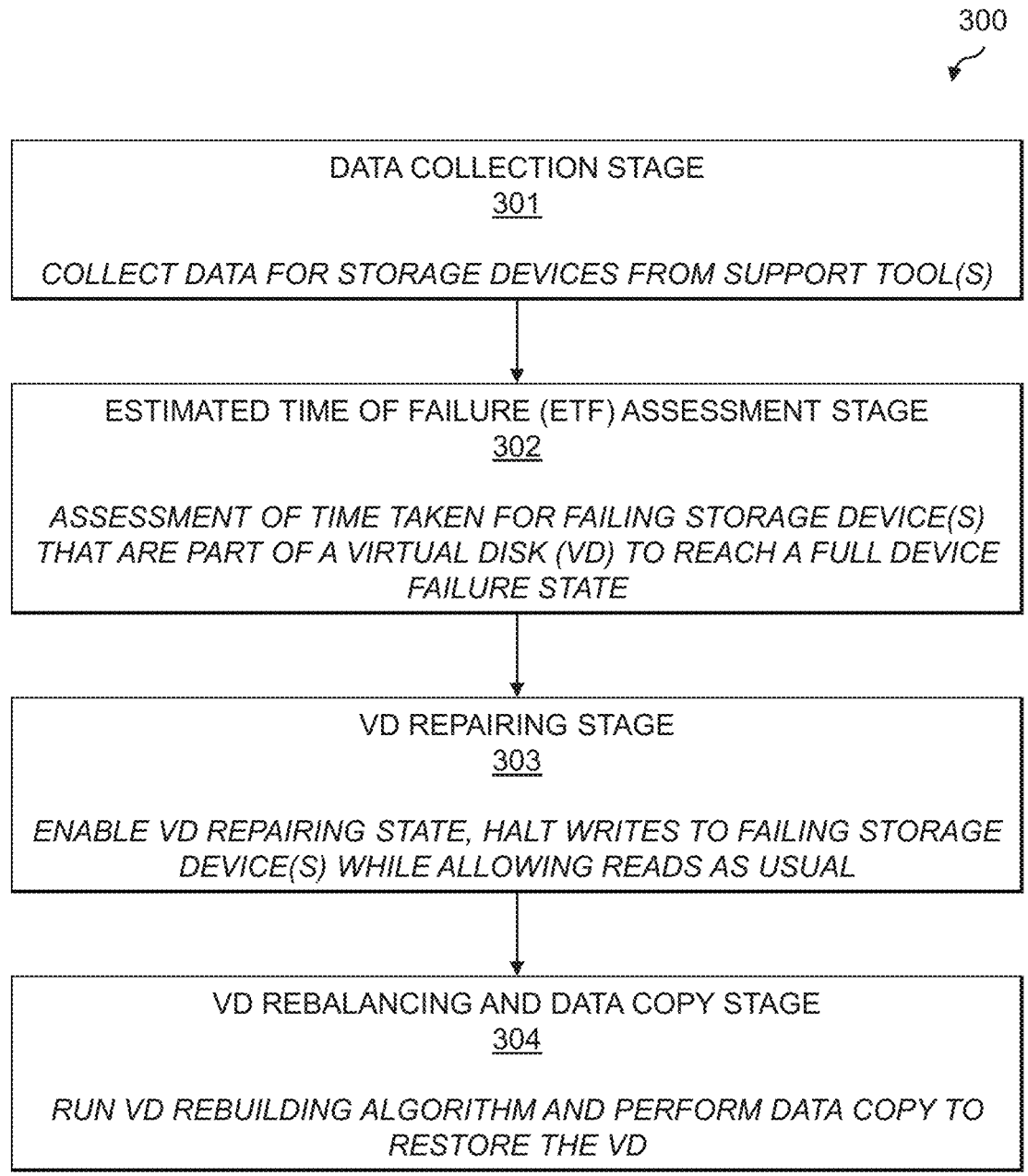
FIG. 3 shows a system flow for providing proactive data rebalancing for a redundant array of independent disks (RAID) controller to preserve data in the event of predicted drive failure in a RAID virtual disk in an illustrative embodiment.
Figure 4:
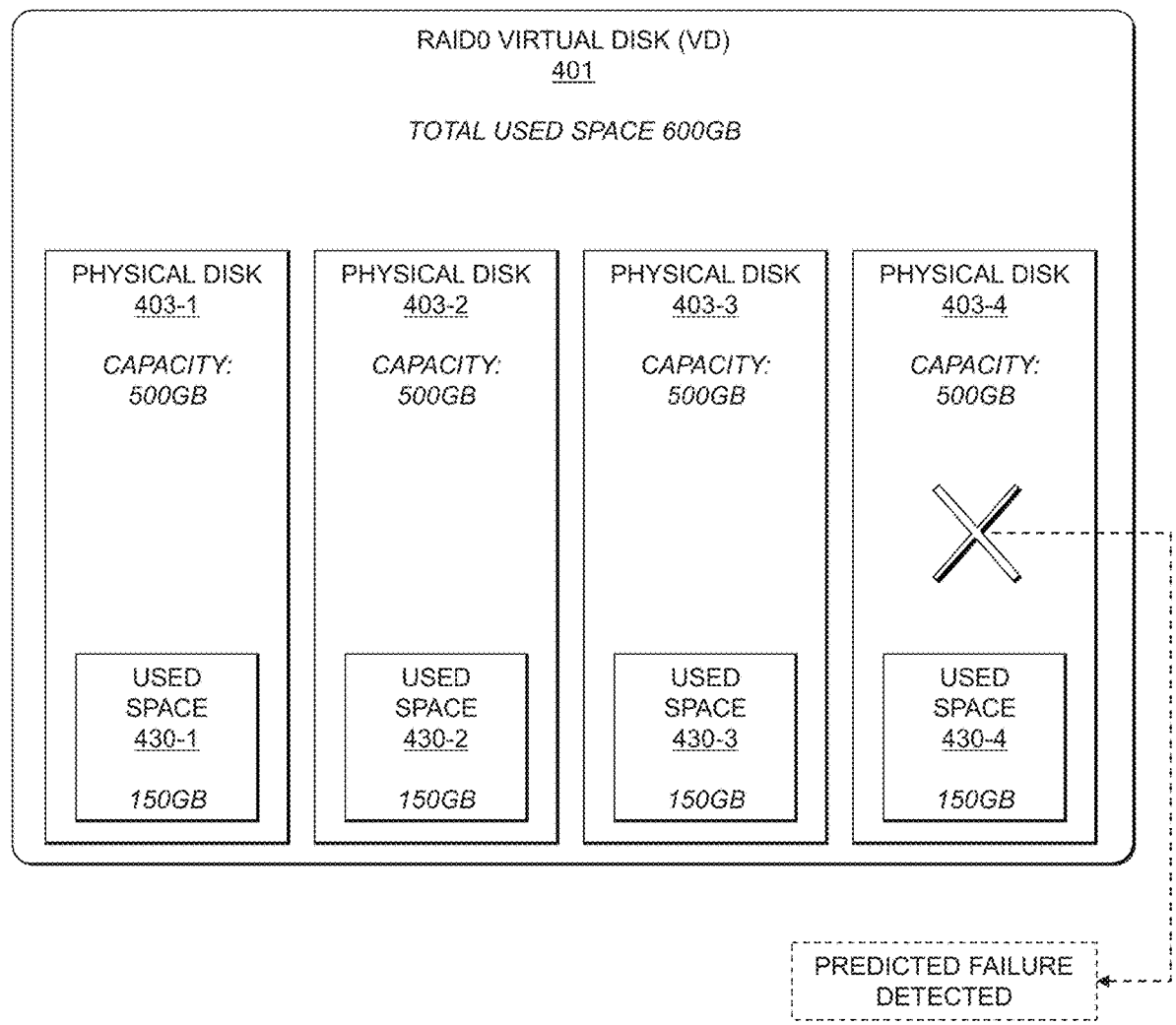
FIG. 4 shows a RAID virtual disk having a physical disk that is predicted to fail in an illustrative embodiment.

FIG. 3 shows a system flow 300 for preserving the data present in one or more failing or unhealthy physical disks of a storage system, where the one or more unhealthy or failing physical disks provide at least a portion of the storage capacity of a VD, such as a VD with a RAID0 configuration. The system flow 300 includes four stages: a data collection stage 301, an estimated time of failure (ETF) assessment stage 302, a virtual disk (VD) repairing stage 303, and a VD rebalancing and data copy stage 304. FIG. 4 shows an example of a RAID0 VD 401 including four physical disks 403-1, 403-2, 403-3 and 403-4 (collectively physical disks 403), which may be subject to the system flow 300. Each of the physical disks 403 in this example has a storage capacity of 500 GB such that the RAID0 VD 401 has a total storage capacity of 2000 GB. A portion of the storage capacity of each of the physical disks 403 is used space 430-1, 430-2, 430-3 and 430-4 (collectively, used space 430). In the FIG. 4 example, the used space 430 on each of the physical disks 403 is 150 GB, such that the RAID0 VD 401 has a total used space of 600 GB.

In the data collection stage 301, data for physical disks that provide a portion of the storage capacity for the VD is collected using one or more support tools. In some embodiments, the identification of physical disk health uses predictive failure reports provided by support tools (e.g., Dell SupportAssist) using SMART functionality. Until a predictive failure is reported for a physical disk associated with the VD, the system flow 300 remains in the data collection stage 301. Following detection of one or more errors for at least one of the physical disks that provide storage capacity for the VD in the data collection stage 301, the system flow proceeds to the ETF assessment stage 302. In the example of FIG. 4, it is assumed that a predicted failure (e.g., one or more errors) is detected on the physical disk 403-4. FIG. 5 shows an example error screenshot 500 which may be generated, for example, using SMART functionality. The error screenshot 500 includes various information, such as the date, time message identifier (ID), message content, log sequence number, detailed description and recommended action. It should be appreciated, however, that these fields are presented by way of example only, and that error messages may include various other fields or information in addition to or in place of the fields shown in the error screenshot 500 of FIG. 5.

In the ETF assessment stage 302, an assessment is conducted of the time taken for an unhealthy or failing physical disk (e.g., the physical disk 403-4 in the example of FIG. 4) to reach a full device failure state. In some embodiments, this assessment is based on the time taken for the percentage of SMART error to increase from a first to a second percentage (e.g., from x % at time xt to y % at time yt). Based at least in part on the time taken for the percentage increase in the reported SMART failure, a remaining time until the unhealthy or failing physical completely fails is determined. This ETF may be reevaluated or reassessed in response to various conditions, such as detecting an increase in SMART error percentage, expiration of some designated time interval, in response to a user request, etc., in order to provide improved accuracy in the ETF prediction.

Figure 6:
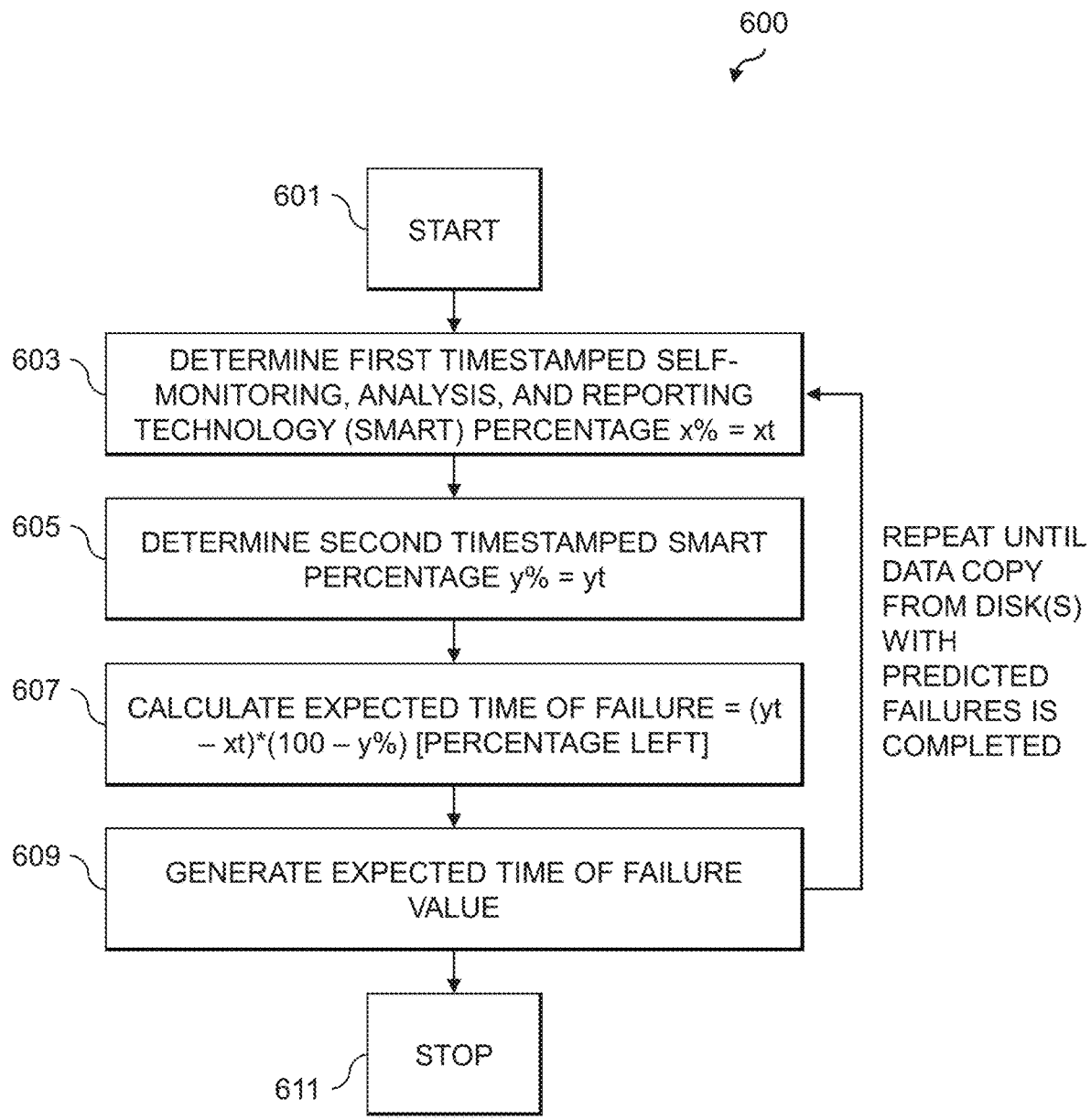
FIG. 6 shows a process flow for monitoring an expected time of failure of a physical disk that is used to provide a portion of a RAID virtual disk in an illustrative embodiment.

FIG. 6 shows a process flow 600 for continuously assessing an ETF value for a failing physical disk. The process flow 600 starts in step 601, and in steps 603 and 605 timestamped SMART percentages are determined. The first timestamped SMART percentage is denoted x %=xt, where x is the reported SMART error percentage for a storage device for a time xt. Similarly, the second timestamped SMART percentage is denoted y %=yt, where y is the reported SMART error percentage for a time yt, with yt being different than xt. In step 607, an ETF is calculated according to (yt−xt)*(100−y %), where the ETF characterizes the percentage left. The calculated ETF is then used in step 609 to generate an ETF value (e.g., a time at which the physical disk is expected to fail). Steps 603 through 609 may be repeated (e.g., continuously, at regular intervals, etc.) until data copy from unhealthy or failing physical disks is completed as described in further detail below. The process flow 600 then stops in step 611.

Once the ETF assessment is completed, a determination is made as to whether healthy physical disks that are part of the VD have enough free space to support a resyncing operation of data from the unhealthy or failing physical disks that are part of the VD (e.g., whether VD rebalancing is feasible). This determination may be based at least in part on the space taken by data on the unhealthy physical disks and the free or available space on the healthy physical disks. In the event that the healthy physical disks do not have enough space to support the resync operation from the unhealthy physical disks, one or more notifications may be generated and provided to end-users, operators or other users (e.g., system administrators, IT support staff) which manage the RAID0 VD 401. In the event that the healthy physical disks do have enough space to support the resync operation from the unhealthy physical disks, the system flow of FIG. 3 enters the VD repairing stage 303.

Figure 7:
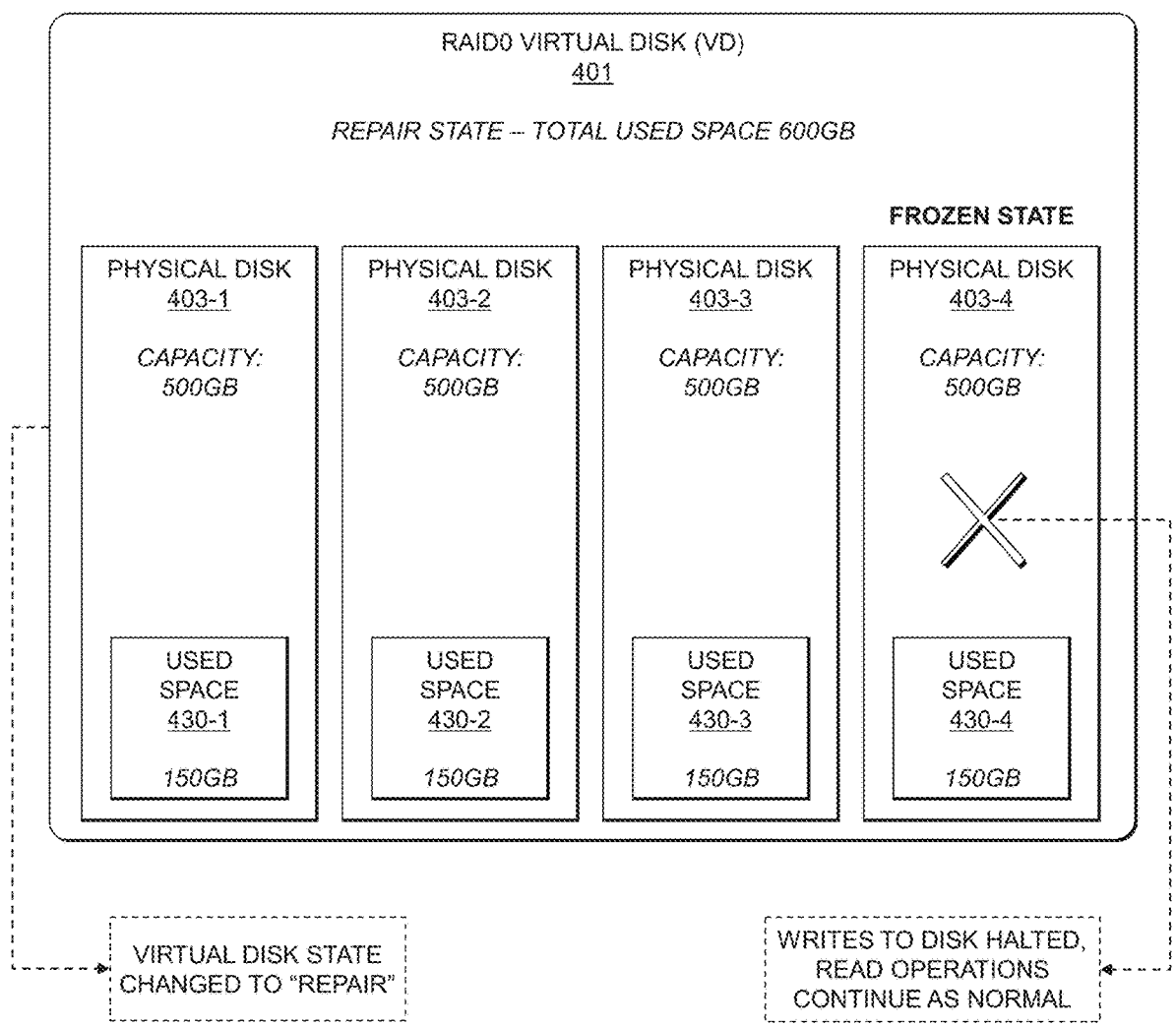
FIG. 7 shows a RAID virtual disk having a physical disk that is predicted to fail which has entered a repair state in an illustrative embodiment.

In the example of FIG. 7, where each of the physical disks 403 has a capacity of 500 GB with used space 430 of 150 GB, there is sufficient available capacity to migrate data in the used space 430-4 of the unhealthy physical disk 403-4 to empty space on the healthy physical disks 403-1, 403-2 and 403-3. The RAID0 VD 401 is created using the four physical disks 403 with 500 GB capacity each, such that the total size is 2000 GB. In the RAID0 VD 401, 600 GB is used space 430 (e.g., 150 GB on each of the physical disks 403). Since a RAID0 striping mechanism is used, the data is evenly split across the four physical disks 403. The physical disk 403-4 is predicted to have a failure in the near future (e.g., as determined by its ETF value calculated in the ETF assessment stage 302). Since each of the physical disks 403 is of size 500 GB and has 150 GB used space 430, the free or available space in each of the healthy physical disks 403-1, 403-2 and 403-3 is 350 GB. Thus, in the FIG. 7 example, the total VD size is 2000 GB, the total data size (used space 430) is 600 GB (e.g., 150 GB on each of the four physical disks 403), and the size of the data to be copied is 150 GB (e.g., the used space 430-4 on the failing physical disk 403-4). Again, the available space on the healthy physical disks 403-1, 403-2 and 403-3 is 1050 GB (350 GB on each). Since the available space (e.g., 1050 GB) exceeds the size of the data to be copied (e.g., 150 GB), it is feasible to perform VD rebalancing.

If there is sufficient free or available capacity on the healthy physical disks, then the system flow 300 enters the VD repairing stage 303, where a VD repairing state in enabled. In the VD repairing state, writes to unhealthy physical disks are halted while allowing reads as usual. FIG. 7 shows the RAID0 VD 401 in the repair state, where the unhealthy physical disk 403-4 is in a frozen state where writes are halted but read operations continue as normal. Both reads and writes to the healthy physical disks 403-1, 403-2 and 403-3 continue as normal.

In the VD rebalancing and data copy stage 304, a VD rebuilding algorithm is run and data copy is performed to restore the VD to a normal operating state. This may include resizing the VD to an N-M disk size, where N is the original number of physical disks that are part of the VD and M is the number of unhealthy or failing physical disks. Writes are halted to the unhealthy physical disks (e.g., which are in the frozen state as described above), while reads continue as is. Data is migrated from the used space on the unhealthy disks to empty space on the healthy physical disks. The amount of resources which are allocated for the data migration operation may be based at least in part on the ETF of the unhealthy physical disks determined during the ETF assessment stage 302. As noted above, the ETF may be reevaluated periodically or continually such that the resources allocated for the data migration operation may be dynamically adjusted according to the reevaluated ETF values. The ETF can be calculated based at least in part on data collected using SMART functionality through support tools such as Dell SupportAssist. Generally, data copy will take place from the unhealthy physical disks when there is lesser IO traffic on the storage controller to ensure that performance of the VD is not significantly affected. If, however, the ETF is imminent, the data copy may be prioritized to avoid or mitigate data loss. Following completion of resyncing and rebalancing operations, support tools (e.g., Dell SupportAssist) may generate appropriate logs.

Figure 8:
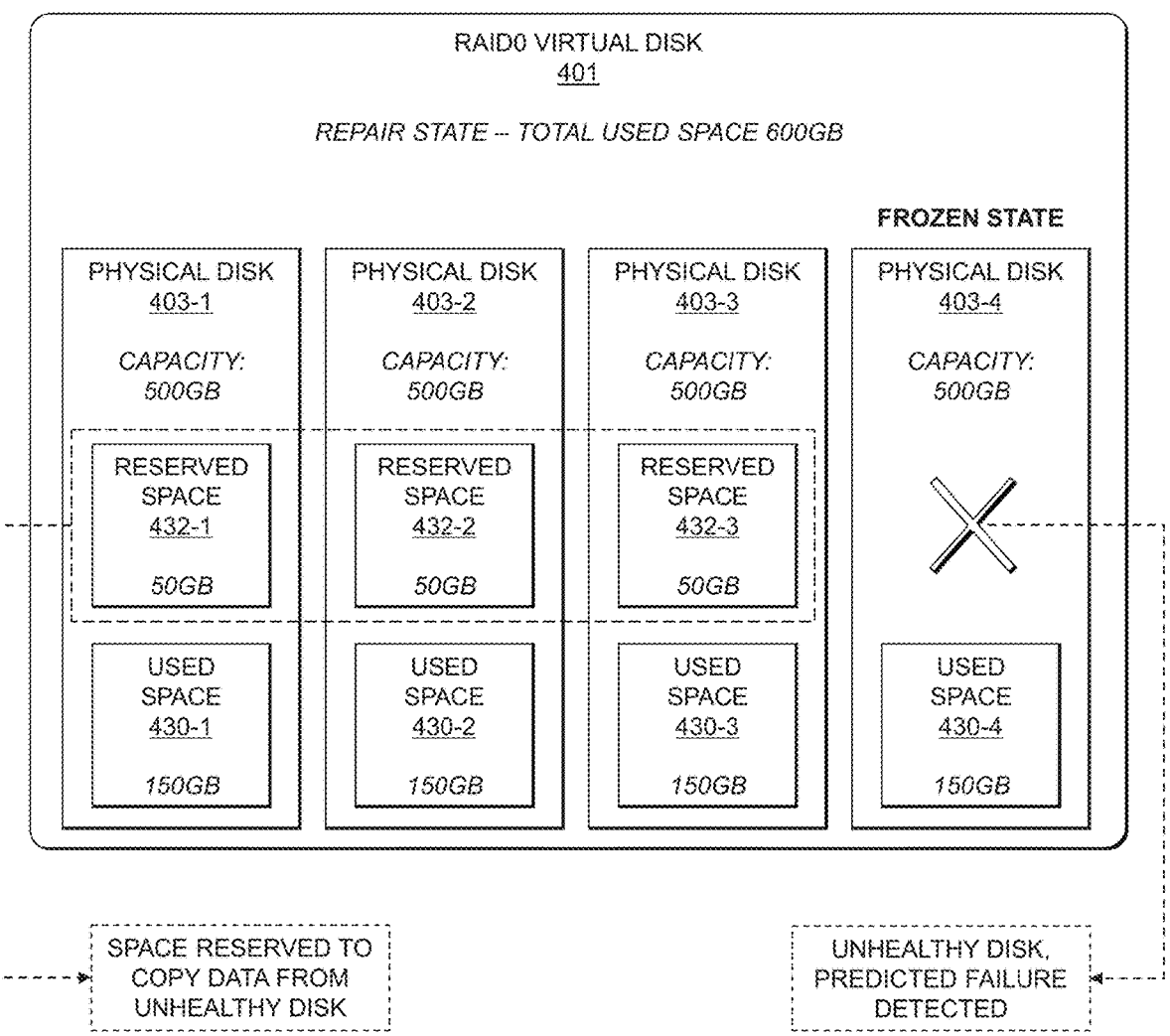
FIG. 8 shows a RAID virtual disk where portions of healthy physical disks have space reserved for copying data from a physical disk that is predicted to fail in an illustrative embodiment.

In the VD rebalancing and data copy stage 304, space is reserved on the healthy physical disks to copy data from the unhealthy or failing physical disks. This is illustrated in FIG. 8, which shows the healthy physical disks 403-1, 403-2 and 403-3 with reserved space 432-1, 432-2 and 432-3 (collectively, reserved space 432) for copying data from the used space 430-4 of the unhealthy or failing physical disk 403-4 that is in the frozen state. Here, the reserved space 432 is 50 GB on each of the physical disks 403-1, 403-2 and 403-3 (e.g., to evenly distribute the 150 GB of used space 430-4 on the physical disk 403-4). The VD rebuilding algorithm controls or modulates the speed of data copy operations from the unhealthy physical disks to the healthy physical disks based on the predicted ETF value computed in the ETF assessment stage 302. FIG. 9 shows a table 900 illustrating different policies which may be selected according to the ETF value computed for unhealthy or failing physical disks (e.g., the unhealthy or failing physical disk 403-4 in the example of FIG. 8). While the table 900 shows three potential policies which adjust storage controller bandwidth used for IO management and VD repair, it should be appreciated that more or less than three policies may be used. In some cases, policies may be added, removed or modified as desired by end-users. Further, the particular threshold percentage values and amounts of storage controller bandwidth shown in the example policies of the table 900 may be adjusted as desired for a particular use case. Generally, storage controller bandwidth is more aggressively weighted towards VD repair (e.g., data copy operations from unhealthy physical disks to healthy physical disks) as the predicted failure percentage increases.

Depending on the estimated time left for one or more unhealthy physical disks to fail completely, a policy is selected from among the policies set forth in the table 900 (or other custom policies which may be defined by an end-user). The selected policy is used to determine and control that allocation of storage controller bandwidth between incoming IO management and data copy operations for the VD repair. If there is sufficient time until the unhealthy physical disks are predicted to fail completely, then the storage controller bandwidth may be used for data copy operations for the VD repair when the storage controller is idle or less loaded with new IO management operations as per policy 1 of the table 900. As the predicted time to failure for the unhealthy physical disks decreases, more storage controller bandwidth will be allocated for data copy operations for the VD repair relative to incoming IO management. This may include transitioning to policy 2 or policy 3 as appropriate given the predicted time to failure (e.g., the ETF value calculated in the ETF assessment stage 302).

The VD rebalancing algorithm determines the available data which is present on the unhealthy physical disks, as well as the free space or capacity on any remaining healthy physical disks which are part of the VD. Based on the amount of data stored on the unhealthy physical disks, required space will be reserved on any remaining healthy physical disks, as illustrated in FIG. 8 described above. The VD rebalancing algorithm will then resize the virtual disk to an N-M disk size, where N is the total number of physical disks that are part of the VD (e.g., including both healthy and unhealthy physical disks) and M is the total number of unhealthy physical disks. In the FIG. 8 example, N is 4 and M is 1. Metadata in the healthy physical disks associated with the VD will be rewritten to make the size of the VD N-M disk size. In the FIG. 8 example, the reserved space 432 on each of the healthy physical disks 302-1, 302-2 and 302-3 is 50 GB, as the total used space 430-4 on the unhealthy physical disk 302-4 is 150 GB. The total size of the RAID0 VD 401 is reduced from 2000 GB (e.g., 500 GB from each of the four physical disks 402) to 1500 GB (e.g., 500 GB from each of the three healthy physical disks 402-1, 402-2 and 402-3).

Figure 10:
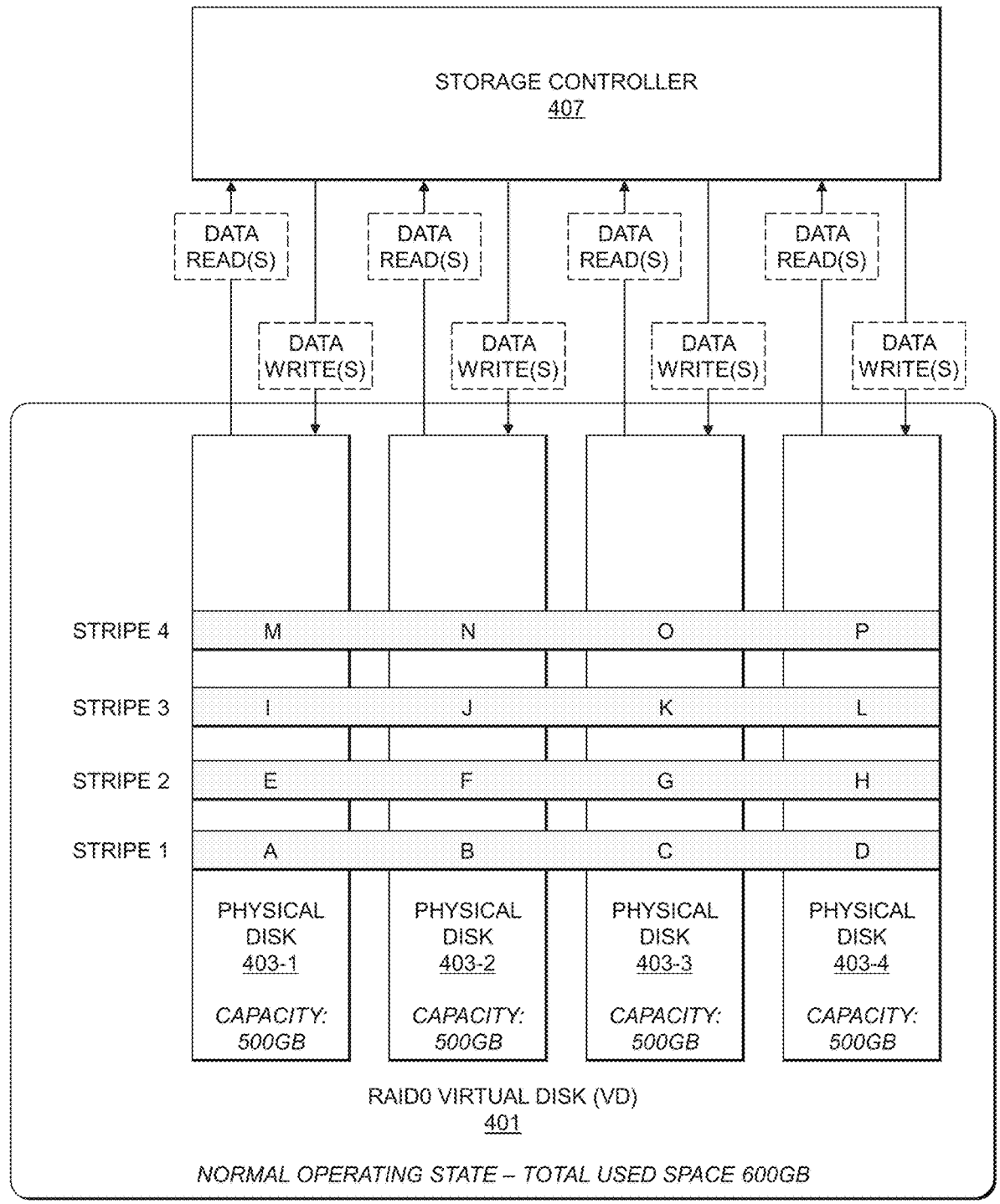
FIG. 10 shows a storage controller performing data reads and writes with a RAID virtual disk in a normal operating state in an illustrative embodiment.
Figure 11:
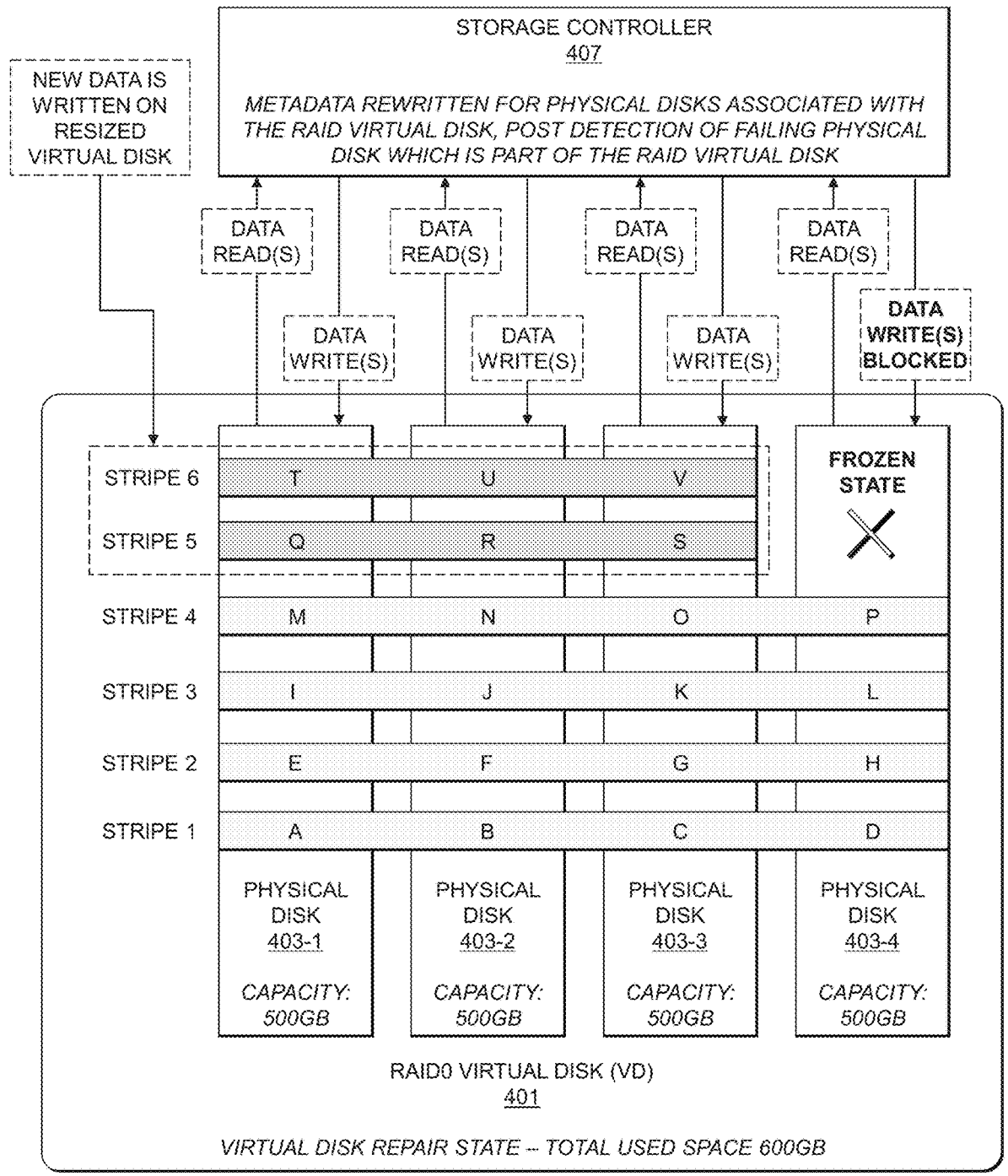
FIG. 11 shows a storage controller performing data reads and writes with a RAID virtual disk in a repair state in an illustrative embodiment.
Figure 12:
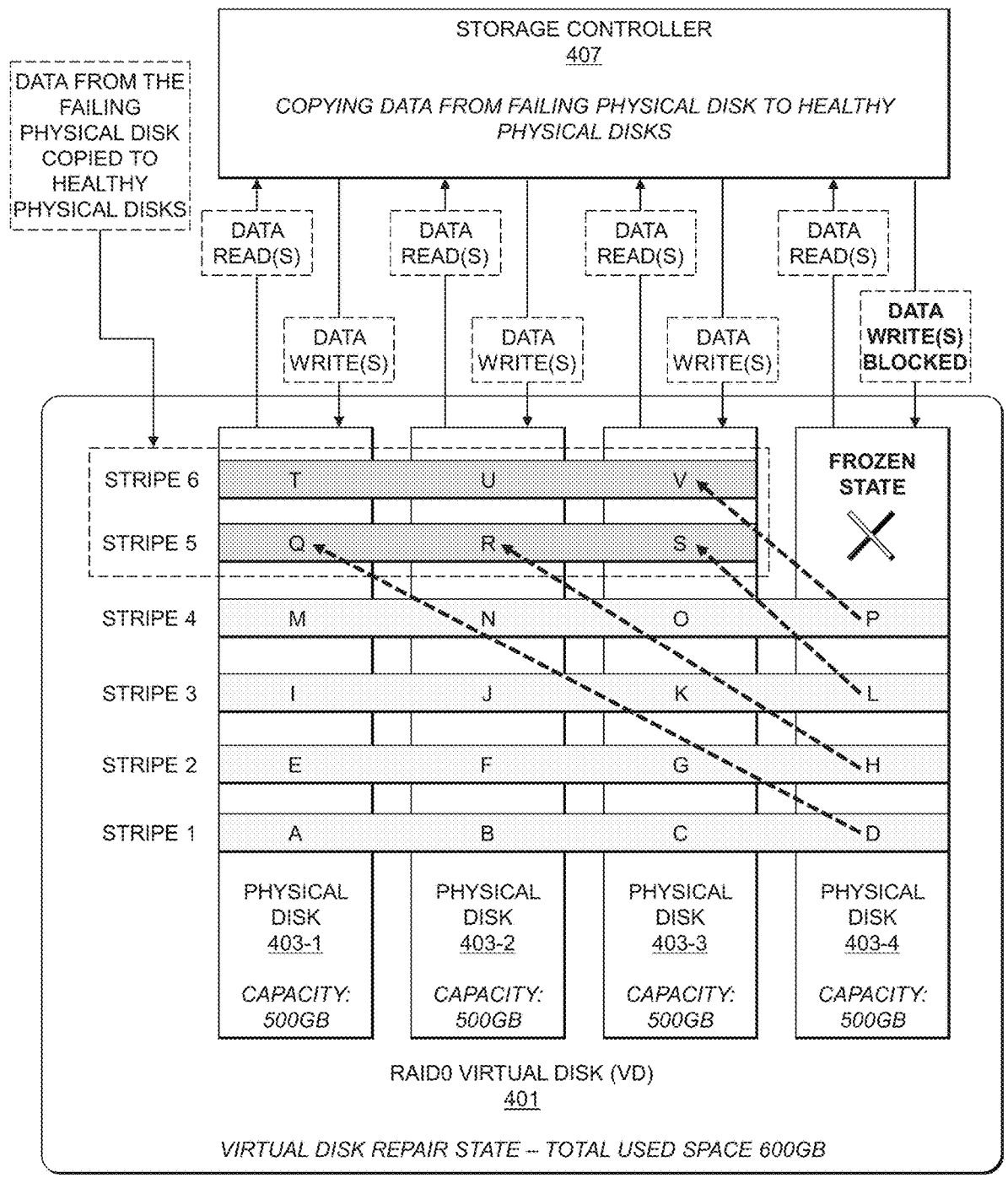
FIG. 12 shows a storage controller moving data from a physical disk that is predicted to fail to newly allocated stripes of healthy physical disks providing at least a portion of a RAID virtual disk in an illustrative embodiment.

FIG. 10 shows a storage controller 407 coupled to the RAID0 VD 401, where the storage controller 407 coordinates data reads and writes to the RAID0 VD 401. In the normal operating state, the RAID0 VD 401 includes stripes that span each of the physical disks 403 that are part of the RAID0 VD 401. Thus, as illustrated in FIG. 10, stripe 1 includes strips A, B, C and D on physical disks 403-1, 403-2, 403-3 and 403-4, respectively. Similarly, stripes 2, 3 and 4 include strips E-H, I-L and M-P on different ones of the physical disks 403. FIG. 11 shows the RAID0 VD 401 in the repair state, where the unhealthy physical disk 403-4 is in the frozen state and data writes to the unhealthy physical disk 403-4 are blocked. Data reads to the unhealthy physical disk 403-4 continue as normal. Data reads and writes to the healthy physical disks 403-1, 403-2 and 403-3 also continue as normal. The storage controller 407 will use its internal logic to re-stripe and create one or more stripes on the three healthy physical disks 403-1, 403-2 and 403-3, instead of stripes on the four physical disks 403-1, 403-2, 403-3 and 403-4. In the FIG. 11 example, such created stripes include stripes 5 and 6. The stripe 5 includes strips Q, R and S on the physical disks 403-1, 403-2 and 403-3, while the stripe 6 includes strips T, U and V on the physical disks 403-1, 403-2 and 403-3. Any new data is written to the resized VD in stripes 5 and 6. The storage controller 407 has metadata rewritten for the physical disks 403 following detection of the failing physical disk 403-4. After the resizing of the RAID0 VD 401, the data will be copied to the healthy physical disks 403-1, 403-2 and 403-3 in a striped manner, with internal addressing changes mapped by the storage controller 406 to ensure data integrity is maintained. FIG. 12 illustrates data copy from strips on the unhealthy physical disk 403-4 to strips of the new stripes 5 and 6 which span the healthy physical disks 403-1, 403-2 and 403-3. In the FIG. 12 example, data from the unhealthy physical disk 403-4 is copied from: stripe 1, strip D to stripe 5, strip Q; stripe 2, strip H to stripe 5, strip R; stripe 3, strip L to stripe 5, strip S; and stripe 4, strip P to stripe 6, strip V.

In the example of FIGS. 10-12, the RAID0 VD 401 is created using the four physical disks 403 each having a capacity of 500 GB, such that the total size of the RAID0 VD 401 exposed to end-users (e.g., hosts that access the RAID0 VD 401) is 2000 GB. It is assumed that there is some amount of data written to the RAID0 VD 401, represented as the used space 430 on the physical disks 403, where the used space 430 totals 600 GB (e.g., 150 GB used space on each of the physical disks 403). The physical disk 403-4 is predicted to have a failure in the near future, and is thus considered an unhealthy physical disk. To avoid or mitigate data loss, the technical solutions described herein enable movement of data from the used space 430-4 on the unhealthy physical disk 403-4 to the other (healthy) physical disks 403-1, 403-2 and 403-3 which are part of the RAID0 VD 401.

Since each of the physical disks 403 in this example has a size of 500 GB and has 150 GB of used space 430, the free space available on each of the healthy physical disks 403-1, 403-2 and 403-3 is 350 GB. The combined free space across the healthy physical disks 403-1, 403-2 and 403-3 can support copy of the data from the unhealthy physical disk 403-4 (e.g., the total size of the RAID0 VD 401 is 2000 GB, the total used space of the RAID0 VD 401 is 600 GB, the size of the data to be copied from the unhealthy physical disk 403-4 is 150 GB, and the combined available free space on the healthy physical disks 403-1, 403-2 and 403-3 is 1050 GB which exceeds the size of the data to be copied from the unhealthy physical disk 403-4). Once it is assessed that data copy from the unhealthy physical disk 403-4 to the healthy physical disks 403-1, 403-2 and 403-3 is feasible, the RAID0 VD 401 transitions to the repair state (e.g., as shown in FIG. 11) where the unhealthy physical disk 403-4 is placed in a frozen state and the RAID0 VD 401 is resized to an N-M disk size, where N=4 represents the total number of physical disks 403 that are part of the RAID0 VD 401 and M=1 represents the total number of unhealthy ones of the physical disks 403 that are part of the RAID0 VD 401. Here, the new size of the RAID0 VD 401 is 1500 GB (e.g., 500 GB from each of the healthy physical disks 403-1, 403-2 and 403-3). The technical solutions described herein will calculate the time left for the unhealthy physical disk 403-4 to completely fail (e.g., become unusable) and, based at least in part on the time left, a data copy policy is chosen (e.g., from among a set of policies such as those shown in the table 900 of FIG. 9). If, for example, the time left is relatively short (e.g., minutes) then the selected copy policy is aggressively weighted towards VD repair relative to incoming IO management. Once the VD repair (e.g., data copy operations from the unhealthy physical disk 403-4 to the healthy physical disks 403-1, 403-2 and 403-3) is completed, the RAID0 VD 401 may be change back to a normal operating state.

It should be noted that while in the example of FIGS. 10-12 there is only one unhealthy physical disk, it is possible that multiple physical disks which are part of a VD may be unhealthy. In such cases, an assessment is similarly made as to whether any remaining healthy physical disks which are part of the VD have sufficient available capacity to accommodate data copy from the multiple unhealthy physical disks. Continuing with the example RAID0 VD 401 of FIG. 10, if both the physical disks 403-3 and 403-4 were unhealthy (e.g., have predicted failure), the free space on the remaining healthy physical disks 403-1 and 403-2 would still be sufficient to copy data from the used space 430-3 and 430-4 of the unhealthy physical disks 403-3 and 403-4. If the used space 430 on each of the physical disks 403 were higher (e.g., 475 GB rather than 150 GB), then there would not be sufficient available capacity for data copy from even a single unhealthy physical disk 403-4. In such cases, notifications may be generated indicating to a user that VD rebalancing is not possible and that other remedial action may be needed to avoid or mitigate data loss.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for proactive rebalancing of data among storage devices that are part of a virtual disk will now be described in greater detail with reference to FIGS. 13 and 14. Although described in the context of system 100, these platforms may also be used to implement at least portions of other information processing systems in other embodiments.

Figure 13:
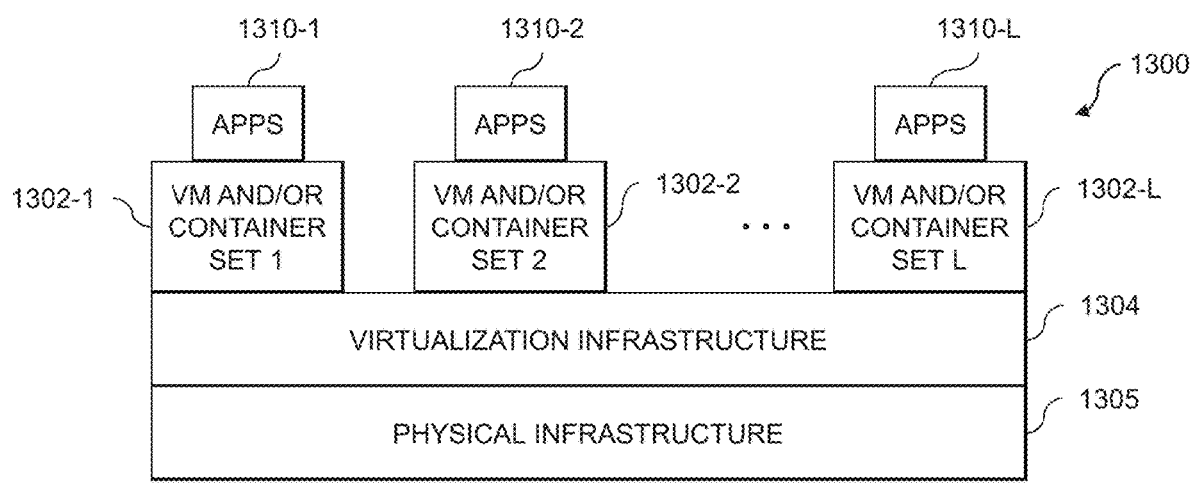
FIGS. 13 and 14 show examples of processing platforms that may be utilized to implement at least a portion of an information processing system in illustrative embodiments.
Figure 14:
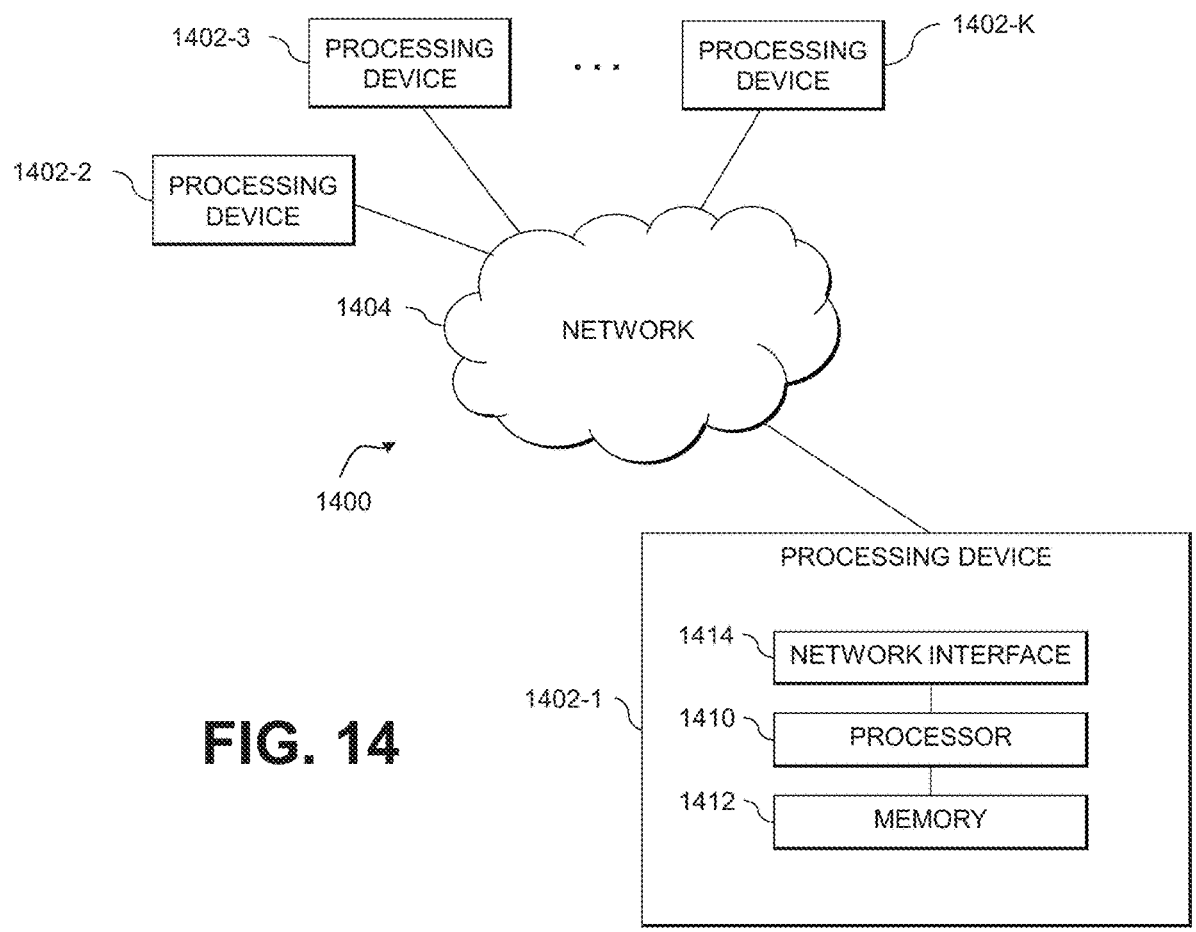

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for proactive rebalancing of data among storage devices that are part of a virtual disk as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
   to monitor a health status of two or more storage devices that are part of a virtual disk, the virtual disk utilizing a redundant array of independent disks striping configuration;
   to identify, based at least in part on the monitored health status, a first subset of the two or more storage devices that have a first health status and a second subset of the two or more storage devices that have a second health status;
   to monitor, for each of the storage devices in the first subset of the two or more storage devices, an estimated time to failure, wherein monitoring the estimated time to failure for a given one of the storage devices in the first subset of the two or more storage devices is based at least in part on determining one or more changes in error percentages in a sequence of two or more timestamped error logs associated with the given storage device;

to determine whether available storage capacity on the second subset of the two or more storage devices is sufficient to copy data from used storage capacity on the first subset of the two or more storage devices;
responsive to determining that there is sufficient available storage capacity on the second subset of the two or more storage devices, to resize the virtual disk from (i) a first storage capacity determined at least in part as a function of portions of storage capacities of the first and second subsets of the two or more storage devices which are allocated to the virtual disk to (ii) a second storage capacity determined at least in part as a function of portions of storage capacities of the second subset of the two or more storage devices which are allocated to the virtual disk;
to copy data from the used storage capacity on the first subset of the two or more storage devices to the available storage capacity on the second subset of the two or more storage devices; and
to dynamically adjust, in conjunction with copying of the data from the used storage capacity on the first subset of the two or more storage devices to the available storage capacity on the second subset of the two or more storage devices and based at least in part on the estimated time to failure for each of the storage devices in the first subset of the two or more storage devices, a first amount of storage controller bandwidth allocated for copying of the data from the used storage capacity on the first subset of the two or more storage devices to the available storage capacity on the second subset of the two or more storage devices relative to a second amount of storage controller bandwidth allocated for processing incoming input-output operations directed to the virtual disk.

2. The apparatus of claim 1 wherein the redundant array of independent disks striping configuration comprises a RAID0 configuration.

3. The apparatus of claim 1 wherein monitoring the health status of the two or more storage devices that are part of the virtual disk comprises obtaining one or more error logs utilizing one or more support tools associated with a storage system comprising the two or more storage devices.

4. The apparatus of claim 3 wherein the one or more error logs comprise Self-Monitoring, Analysis and Reporting Technology error logs generated by respective ones of the two or more storage devices.

5. The apparatus of claim 1 wherein the first health status comprises a failing health status and the second health status comprises a non-failing health status.

6. The apparatus of claim 1 wherein the at least one processing device is further configured, responsive to determining that there is sufficient available storage capacity on the second subset of the two or more storage devices, to place the first subset of the two or more storage devices in a frozen state where incoming data reads are permitted but incoming data writes are blocked.

7. The apparatus of claim 1 wherein the two or more timestamped error logs comprise Self-Monitoring, Analysis and Reporting Technology (SMART) logs, and wherein the error percentage comprises a percentage of SMART errors.

8. The apparatus of claim 1 wherein monitoring the estimated time to failure for the given storage device comprises dynamically updating the estimated time to failure for the given storage device responsive to detecting an increase in the error percentage between two timestamped error logs in the sequence of two or more timestamped error logs associated with the given storage device.

9. The apparatus of claim 1 the estimated time to failure for the given storage device is determined based at least in part on utilizing the sequence of two or more timestamped error logs associated with the given storage device to calculate a time taken for the error percentage to increase from a first percentage to a second percentage.

10. The apparatus of claim 1 wherein the at least one processing device is further configured, during copying of the data from the used storage capacity on the first subset of the two or more storage devices to the available storage capacity on the second subset of the two or more storage devices:
to determine and dynamically update estimated time to failure values for each of the storage devices in the first subset of the two or more storage devices; and
to dynamically adjust the first amount of storage controller bandwidth allocated for copying the data from the used storage capacity on the first subset of the two or more storage devices to the available storage capacity on the second subset of the two or more storage devices relative to the second amount of storage controller bandwidth allocated for processing of incoming input-output operations directed to the virtual disk based at least in part on the dynamically updated estimated time to failure values for each of the storage devices in the first subset of the two or more storage devices.

11. The apparatus of claim 1 wherein dynamically adjusting the first amount of storage controller bandwidth allocated for copying of the data from the used storage capacity on the first subset of the two or more storage devices to the available storage capacity on the second subset of the two or more storage devices relative to the second amount of storage controller bandwidth allocated for processing incoming input-output operations directed to the virtual disk is based at least in part on the monitored health status of the two or more storage devices.

12. The apparatus of claim 11 wherein controlling the first and second amounts of storage controller bandwidth comprises increasing the second amount of storage controller bandwidth and decreasing the first amount of storage controller bandwidth as a predicted time to failure of one or more of the storage devices in the first subset of the two or more storage devices decreases.

13. The apparatus of claim 11 wherein controlling the first and second amounts of storage controller bandwidth comprises selecting from among two or more policies based at least in part on a predicted time to failure of one or more of the storage devices in the first subset of the two or more storage devices.

14. The apparatus of claim 1 wherein the at least one processing device is further configured, responsive to determining that there is not sufficient available storage capacity on the second subset of the two or more storage devices, to generate and provide one or more notifications to one or more users associated with the virtual disk.

15. A computer program product comprising a non-transitory processor-readable storage medium having stored therein program code of one or more software programs, wherein the program code when executed by at least one processing device causes the at least one processing device:
to monitor a health status of two or more storage devices that are part of a virtual disk, the virtual disk utilizing a redundant array of independent disks striping configuration;

to identify, based at least in part on the monitored health status, a first subset of the two or more storage devices that have a first health status and a second subset of the two or more storage devices that have a second health status;

to monitor, for each of the storage devices in the first subset of the two or more storage devices, an estimated time to failure, wherein monitoring the estimated time to failure for a given one of the storage devices in the first subset of the two or more storage devices is based at least in part on determining one or more changes in error percentages in a sequence of two or more time-stamped error logs associated with the given storage device;

to determine whether available storage capacity on the second subset of the two or more storage devices is sufficient to copy data from used storage capacity on the first subset of the two or more storage devices;

responsive to determining that there is sufficient available storage capacity on the second subset of the two or more storage devices, to resize the virtual disk from (i) a first storage capacity determined at least in part as a function of portions of storage capacities of the first and second subsets of the two or more storage devices which are allocated to the virtual disk to (ii) a second storage capacity determined at least in part as a function of portions of storage capacities of the second subset of the two or more storage devices which are allocated to the virtual disk;

to copy data from the used storage capacity on the first subset of the two or more storage devices to the available storage capacity on the second subset of the two or more storage devices; and to dynamically adjust, in conjunction with copying of the data from the used storage capacity on the first subset of the two or more storage devices to the available storage capacity on the second subset of the two or more storage devices and based at least in part on the estimated time to failure for each of the storage devices in the first subset of the two or more storage devices, a first amount of storage controller bandwidth allocated for copying of the data from the used storage capacity on the first subset of the two or more storage devices to the available storage capacity on the second subset of the two or more storage devices relative to a second amount of storage controller bandwidth allocated for processing incoming input-output operations directed to the virtual disk.

16. The computer program product of claim 15 wherein the redundant array of independent disks striping configuration comprises a RAID0 configuration.

17. The computer program product of claim 15 wherein dynamically adjusting the first amount of storage controller bandwidth allocated for copying of the data from the used storage capacity on the first subset of the two or more storage devices to the available storage capacity on the second subset of the two or more storage devices relative to the second amount of storage controller bandwidth allocated for processing incoming input-output operations directed to the virtual disk is based at least in part on the monitored health status of the two or more storage devices.

18. A method comprising:

monitoring a health status of two or more storage devices that are part of a virtual disk, the virtual disk utilizing a redundant array of independent disks striping configuration;

identifying, based at least in part on the monitored health status, a first subset of the two or more storage devices that have a first health status and a second subset of the two or more storage devices that have a second health status;

monitoring, for each of the storage devices in the first subset of the two or more storage devices, an estimated time to failure, wherein monitoring the estimated time to failure for a given one of the storage devices in the first subset of the two or more storage devices is based at least in part on determining one or more changes in error percentages in a sequence of two or more time-stamped error logs associated with the given storage device;

determining whether available storage capacity on the second subset of the two or more storage devices is sufficient to copy data from used storage capacity on the first subset of the two or more storage devices;

responsive to determining that there is sufficient available storage capacity on the second subset of the two or more storage devices, resizing the virtual disk from (i) a first storage capacity determined at least in part as a function of portions of storage capacities of the first and second subsets of the two or more storage devices which are allocated to the virtual disk to (ii) a second storage capacity determined at least in part as a function of portions of storage capacities of the second subset of the two or more storage devices which are allocated to the virtual disk;

copying data from the used storage capacity on the first subset of the two or more storage devices to the available storage capacity on the second subset of the two or more storage devices; and dynamically adjusting, in conjunction with copying of the data from the used storage capacity on the first subset of the two or more storage devices to the available storage capacity on the second subset of the two or more storage devices and based at least in part on the estimated time to failure for each of the storage devices in the first subset of the two or more storage devices, a first amount of storage controller bandwidth allocated for copying of the data from the used storage capacity on the first subset of the two or more storage devices to the available storage capacity on the second subset of the two or more storage devices relative to a second amount of storage controller bandwidth allocated for processing incoming input-output operations directed to the virtual disk;

wherein the method is performed by at least one processing device comprising a processor coupled to a memory.

19. The method of claim 18 wherein the redundant array of independent disks striping configuration comprises a RAID0 configuration.

20. The method of claim 18 wherein dynamically adjusting the first amount of storage controller bandwidth allocated for copying of the data from the used storage capacity on the first subset of the two or more storage devices to the available storage capacity on the second subset of the two or more storage devices relative to the second amount of storage controller bandwidth allocated for processing incoming input-output operations directed to the virtual disk is based at least in part on the monitored health status of the two or more storage devices.

\* \* \* \* \*